United States Patent [19]
Ishitoko et al.

[11] Patent Number: 5,557,045
[45] Date of Patent: Sep. 17, 1996

[54] VIBRATING GYROSCOPE

[75] Inventors: Nobuyuki Ishitoko; Akira Kumada, both of Nagaokakyo, Japan

[73] Assignee: Murata Manufacturing Co. Ltd., Nagaokakyo, Japan

[21] Appl. No.: 372,914

[22] Filed: Jan. 17, 1995

[30] Foreign Application Priority Data

Jan. 21, 1994 [JP] Japan .................................. 6-005291

[51] Int. Cl.⁶ .......................... G01C 19/00; G01P 3/44; G01P 9/00; G01P 15/08
[52] U.S. Cl. ..................... 73/504.14; 73/504.12
[58] Field of Search ...................... 73/504, 493, 517 A, 73/517 AV, 504.04, 504.12, 504.13, 504.14, 504.15; 310/311

[56] References Cited

U.S. PATENT DOCUMENTS

| | | |
|---|---|---|
| 4,836,023 | 6/1989 | Oikawa . |
| 5,315,874 | 6/1994 | Petrovich et al. .......................... 73/493 |
| 5,345,822 | 9/1994 | Nakamura et al. ......................... 73/505 |
| 5,375,336 | 12/1994 | Nakamura ................................. 73/505 |
| 5,377,543 | 1/1995 | Fuchs et al. ............................... 73/504 |

FOREIGN PATENT DOCUMENTS

| | | | |
|---|---|---|---|
| 405240874 | 9/1993 | Japan ........................................ | 73/504 |
| 2208318 | 3/1989 | United Kingdom . | |
| 2251688 | 7/1992 | United Kingdom ....................... | 73/504 |

*Primary Examiner*—Hezron E. Williams
*Assistant Examiner*—Richard A. Moller
*Attorney, Agent, or Firm*—Nikaido, Marmelstein, Murray & Oram LLP

[57] ABSTRACT

The vibrating gyroscope includes, for example, a regular triangular prism-shaped vibrating body. Piezoelectric elements are respectively formed to the three side faces of the vibrating body. An oscillation circuit is connected between two piezoelectric elements and the other piezoelectric element. Two supporting members made of metal wire are mounted to vivinity of nodal points of the vibrating body in order to support the vibrating body. Both ends of the supporting members are fixed to a supporting board. A holding portion for holding a part of the vibrating body is formed on the supporting board. The holding portion is formed by a opening or a recess. The vibrating body together with an oscillation circuit and detection circuit can be mounted on the supporting board. The opening or the recess wherein a part of the vibrating body is held can have a extended portion to enlarge exposing portion of two side faces of the vibrating body.

15 Claims, 4 Drawing Sheets

VIBRATING GYROSCOPE

BACKGROUND OF THE INVENTION

1. Field of the Invention

The present invention is related to a vibrating gyroscope and, more particularly, to the type of vibrating gyroscope that can be applied for a navigation system providing an appropriate guidance of a vehicle by detecting the position of a moving body by sensing its rotational angular velocity, or to the type of vibrating gyroscope that can be applied for a damping system such as preventing device for preventing shaking of hands that suppresses vibration by detecting an external vibration.

2. Description of the Prior Art

FIG. 6 is an exploded perspective view showing an example of a conventional vibrating gyroscope.

The conventional vibrating gyroscope 1 shown in FIG. 6 includes a regular triangular prism-shaped vibrating body 2 made of a constant-elastic metal material such as elinver. On three side faces of the vibrating body 2, piezoelectric elements 3a, 3b, 3c are secured respectively by suitable means such as an adhesive(not shown).

The piezoelectric elements 3a, 3b, 3c are made, for example, by forming electrodes on both surfaces of a piezoelectric ceramics. An oscillation circuit (not shown) described later is connected between the piezoelectric elements 3a, 3b and the piezoelectric element 3c.

Two supporting members 5a and 5b made of metal wire are mounted on ridge-line portions in the vicinity of the nodal points of the vibrating body 2. Each of the supporting members 5a and 5b consists of a pair of legs 6, 6 and a connecting member 7 between two legs 6, 6, and is shaped like a U-shape in cross section. The legs 6, 6 of the supporting members 5a and 5b are mounted on a rectangular-shaped supporting board 10 and each of the connecting members 7 are mounted on the ridge-line portions in the vicinity of the nodal points of the vibrating body 2.

The supporting board 10 has two foot members 11, 11 extending downward from its both ends in the longitudinal direction. Each of the foot members 11, 11 has a projecting piece 11a extending downward from the center of the bottom end of the foot member 11. Two projecting pieces 11a, 11a of the supporting board 10 are inserted into two holes 12a, 12a formed on a circuit board 12. The vibrating body 2 and the supporting board 10 are housed in a case 15.

Circuit components 13, 13 containing an oscillation circuit and a detection circuit are mounted on the circuit board 12. By a signal from the oscillation circuit, the vibrating body 2 bends and vibrates in the direction perpendicular to the face on which the piezoelectric element 3c is formed. In this situation, when a rotation is applied around the central axial direction of the vibrating body 2, a vibration direction of the vibrating body 2 changes by a Corioli's force, according as a change of the vibration direction, a difference is generated between output voltages of the piezoelectric elements 3a and 3b. Thus, a rotational angular velocity applied to the vibrating gyroscope 1 can be detected by measuring the difference of the output voltages.

However, since the vibrating body 2, the supporting members 5a and 5b, the supporting board 10 and the circuit board 12 are constructed to a vertical direction in the conventional vibrating gyroscope 1, it is tall, that is to say, it takes a large space in the vertical direction. Thus, when mounting the vibrating gyroscope 1 in the other device, it occupies large space in the vertical direction. This had been an obstacle to miniaturization of the device. Moreover, a manufacturing process had been complicated because the above each members are constructed to the vertical direction in the conventional vibrating gyroscope 1.

SUMMARY OF THE INVENTION

A major object of the present invention is to provide a vibrating gyroscope which is possible to reduce a height and simplify the manufacturing process and thus is easily manufactured.

In order to achieve the above object, the vibrating gyroscope related to the present invention has a prism-shaped vibrating body, two supporting members are fixed in vicinity of nodal points of the vibrating body in order to support the vibrating body, and a supporting board for fixing both ends portion of the supporting members characterized in that there are provided a holding portion for holding a part of the vibrating body in the supporting board.

The above holding portion is constructed by a opening or a recess. On the supporting board, circuit components are mounted together with the vibrating body.

In the above stated configuration, a part of the vibrating body is held in the opening or the recess provided on the supporting board, so that a projecting size of the vibrating body in the vertical direction is reduced, and thus leads to smaller size of the vibrating gyroscope in height. The circuit components are mounted together with the vibrating body on the supporting board, so that there is no necessity for constructing a different board on which the circuit components are mounted below the supporting board. In this way, the height of the vibrating gyroscope can be further reduced.

According to the present invention, the height of the vibrating gyroscope can be reduced ; and this is a help to miniaturize a device on which the vibrating gyroscope is mounted. A member which fix the supporting member for supporting the vibrating body is configured with a single supporting board, so that there is no necessity for constructing a plurality of the members to the direction of height as the prior art. Consequently, the number of parts can be reduced as a whole, and the manufacturing process is simplified and thus it is possible to lower costs.

The above and other object, features, aspects and advantages of the present invention will become more apparent from the following detailed descriptions of the embodiments with reference to the accompanying drawings.

DESCRIPTION OF THE PREFERRED EMBODIMENTS

Figure 1:
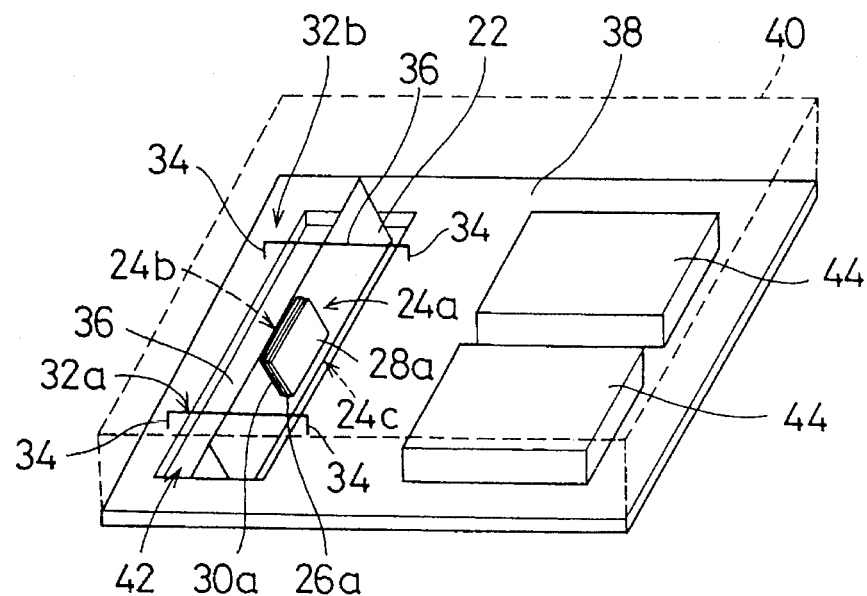
FIG. 1 is a major portion perspective view of one embodiment of the present invention.

FIG. 1 is a major portion perspective view of one embodiment of the present invention.

A vibrating gyroscope 20 comprises a regular triangular prism-shaped vibrating body 22. The vibrating body 22 is formed with a constant-elastic metal material such as elinver, iron-nickel alloy, or is formed with a material which generally generates machanical vibration, such as guartz, glass, crystal, ceramics. Three piezoelectric elements 24a, 24b, 24c are secured respectively on three side faces of the vibrating body 22. The piezoelectric element 24a has a piezoelectric plate 26a made of piezoelectric ceramics, two electrodes 28a and 30a are formed on both surfaces of the piezoelectric plate 26a. The electrode 30a is secured to a side face of the vibrating body 22. Similarly, two piezoelectric elements 24b and 24c have piezoelectric plates 26b and 26c (not shown), and electrodes 28b, 30b (not shown) and electrodes 28c, 30c (not shown) are formed on both surfaces of piezoelectric plates 26b and 26c. The electrodes 30b and 30c of the piezoelectric elements 24b and 24c are secured to surfaces of the vibrating body 22.

Two supporting members 32a and 32b made of metal wire are mounted on ridge-line portions between two side faces on which the piezoelectric elements 24a and 24b are formed of the vibrating body 22. Each of the supporting members 32a and 32b consists of a pair of legs 34, 34 and a connecting member 36 between two legs 34, 34, and is shaped like a U-shape as a whole. One supporting member 32a includes the straight connecting member 36 extending in the transverse direction to the vibrating body 22 and the two straight legs 34, 34 are bent downward from both ends of the connecting member 36. On the other hand, the other supporting member 32b is in the same structure as the supporting member 32a and has the connecting member 36 and a pair of legs 34, 34.

The midpoints of the connecting members 36 of the supporting members 32a and 32b are secured by means of welding process or an adhesive to the ridge-line portions of the vibrating body 22 on which the piezoelectric elements 24a and 24b are formed. In this embodiment, let the length of the vibrating body 22 in the longitudinal direction be L, then the supporting members 32a and 32b are secured to the points 0.224 L away from opposite ends of the vibrating body 22 in the longitudinal direction.

The tips of the legs 34, 34 of the supporting members 32a and 32b are fixed onto a surface of the rectangular supporting board 38. The supporting board 38 is made of a metal or a resin. In this situation, the vibrating gyroscope 20 is housed in a case 40.

A part of the vibrating body 22 is held in a holding portion provided on the supporting board 38. That is, the supporting board 38 has a opening 42 in a location near one end of the supporting board 38 as holding portion for holding the part of the vibrating body 22. The opening 42 pierces through the supporting board 38 from one main surface of the supporting board 38 to the other main surface of the supporting board 38, and the opening 42 is formed to a rectangular-shaped configuration from the viewpoint of a plane. The opening 42 is larger than one side face equivalent for the bottom face of the vibrating body 22. The vibrating body 22 is mounted on the supporting board 38 by two supporting members 32a and 32b while its lower portion is held in the opening 42.

Circuit components 44 which are an oscillation circuit and a detecting circuit are mounted in a location near the other side end of the supporting board 38. In this case, the circuit components 44 are mounted together with the vibrating body 22 on the supporting board 38 at a prescribed distance from the vibrating body 22.

In the vibrating gyroscope 20 shown in FIG. 1, since the lower part of the vibrating body 22 is held in the opening 42 provided on the supporting board 38, the height of the vibrating body 22 above the supporting board 38 is reduced when compared with the vibrating gyroscope based on the prior art. This results in a smaller size of the vibrating gyroscope 20 in height. Since the lower portion of the vibrating body 22 is held in the opening 42 provided on the supporting board 38, the length of the legs 34, 34 of the supporting members 32a and 32b are shortened and thus the vibrating body 22 is fixed onto the supporting board 38 more strongly.

Figure 6:
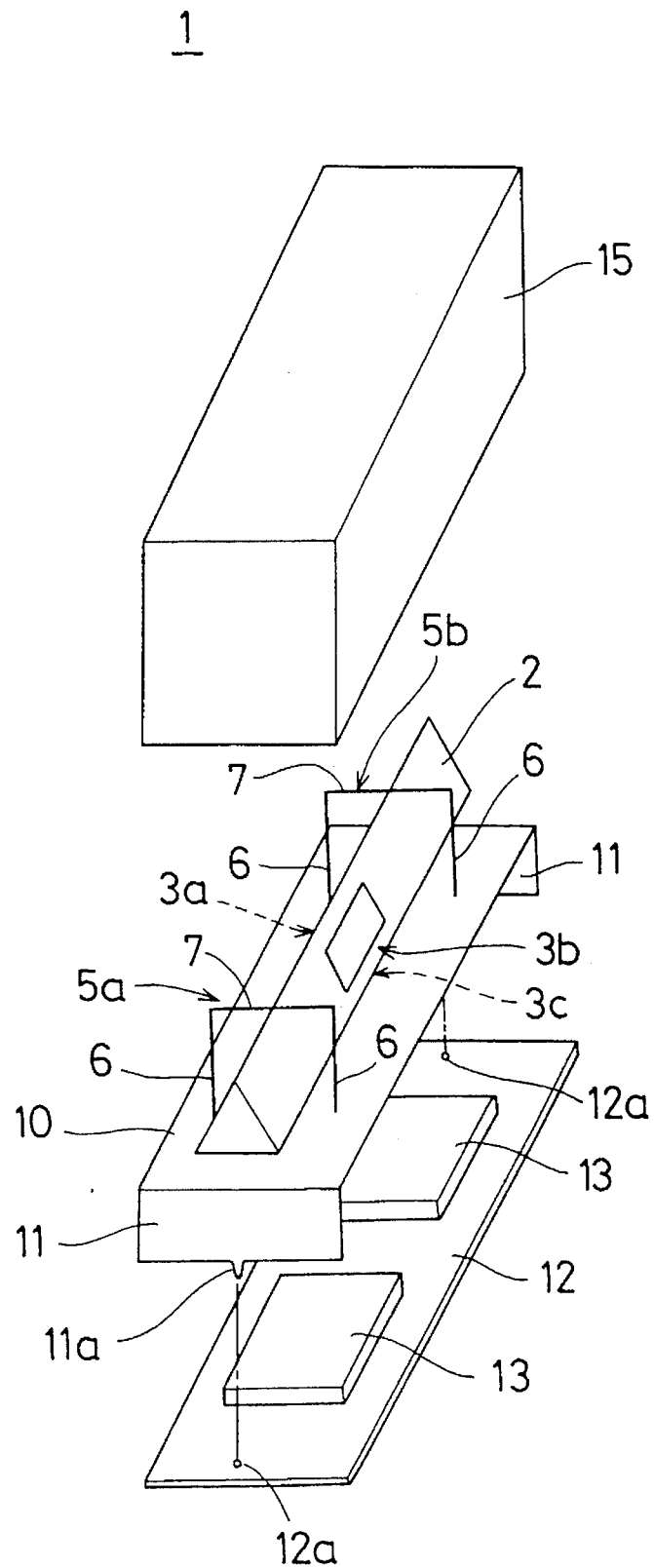
FIG. 6 is an exploded perspective view showing an example of a conventional vibrating gyroscope.

Moreover, since the circuit components 44 are mounted together with the vibrating body 22 on the supporting board 38, an additional board for mounting the circuit components below the supporting board 38 is not necessary as is needed for the conventional vibrating gyroscope 1 shown in FIG. 6. Consequently, the height of the vibrating gyroscope 20 shown in FIG. 1 is smaller than the vibrating gyroscope based on the prior art.

Since all the components are mounted on a single supporting board 38 in the vibrating gyroscope 20 constructed by this embodiment and the vibrating body 22 does not protrude upward from the supporting board 38, the entire height of vibrating gyroscope 20 can be reduced. Therefore, a plurality of the vibrating gyroscopes 20 can be piled easily as shown in FIG. 2.

Figure 2:
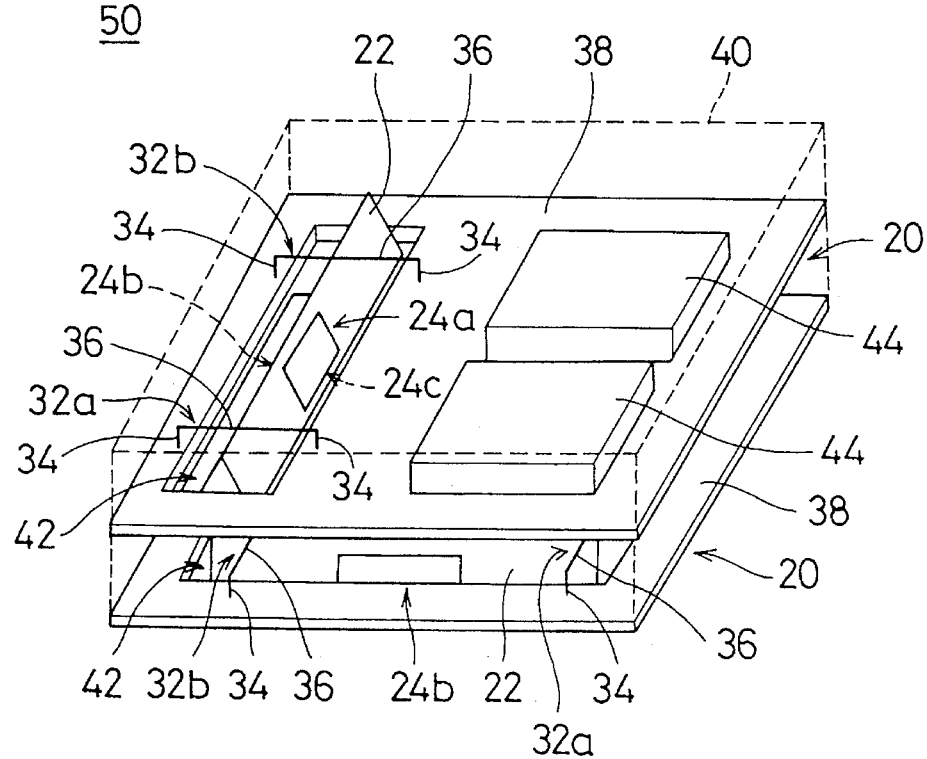
FIG. 2 is a major portion perspective view of an applied example of the vibrating gyroscope shown in FIG. 1.

The vibrating gyroscope 50 shown in FIG. 2 is constructed by two vibrating bodies 22, 22 of two vibrating gyroscopes 20, 20 are piled up in a vertical direction in a way two vibrating bodies 22, 22 are perpendicular to each other. Thus, rotational angular velocity in two directions can be detected by the vibrating gyroscope 50. Moreover, rotational angular velocity in three or more of directions can be detected by means of making a pile of three or more of the vibrating gyroscopes 20.

Figure 3:
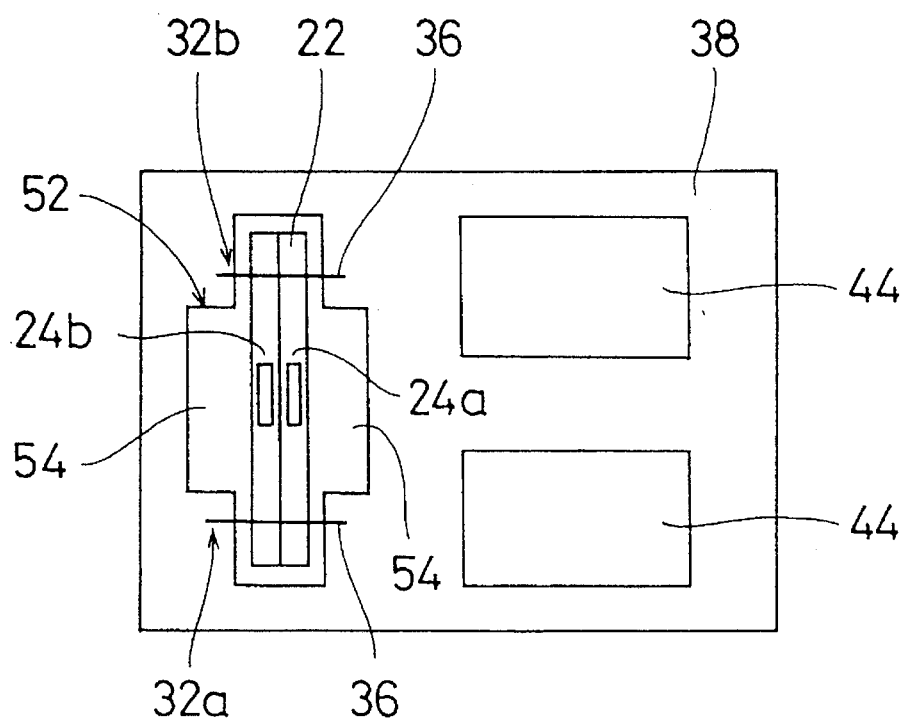
FIG. 3 is a major portion plane view a modified example of the vibrating gyroscope shown in FIG. 1.

FIG. 3 is a major portion plane view a modified example of the vibrating gyroscope shown in FIG. 1.

As the opening, its shape can also be cross-shaped configuration from the viewpoint of a plane like the opening 52 as shown in FIG. 3. The opening 52 has two extended portions 54, 54 to enlarge exposing portion of two side faces of the vibrating body 22 on which the piezoelectric elements 24a and 24b are secured as compared with the opening 42 shown in FIGS. 1 and 2.

Thus, a manufacturing such as trimming for frequency adjustment can easily be performed on side faces of the vibrating body 22 in the vibrating gyroscope 20 shown in FIG. 3.

Figure 4:
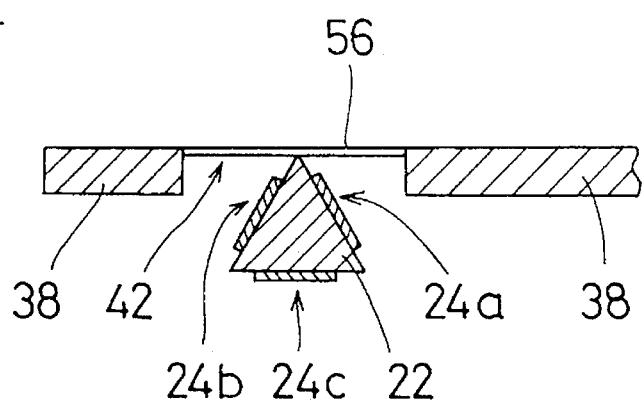
FIG. 4 is a major portion sectional view of an another modified example of the vibrating gyroscope shown in FIG. 1.

FIG. 4 is a major portion sectional view of an another modified example of the vibrating gyroscope shown in FIG. 1.

In this modified example, particularly, the upper part of the vibrating body 22 is held in the opening 42 of the supporting board 38, as compared with each of embodiments show in FIGS. 1, 2 and 3. In this case, the supporting members 56 are straight in shape, and both ends of them are fixed to end of the peripheries of the opening 42. In other words, supporting member 56, the members corresponding to the supporting member 32a (32b), a pair of legs 34, 34 and connecting member 36 shown in FIGS. 1, 2 and 3 are designed to a single straight member.

In the vibrating gyroscope 20 shown in FIG. 4, similarly to the modified example shown in FIG. 3, a manufacturing can also be performed easily on the two side faces of the vibrating body 22, so that this facilitates trimming for frequency adjustment.

Figure 5:
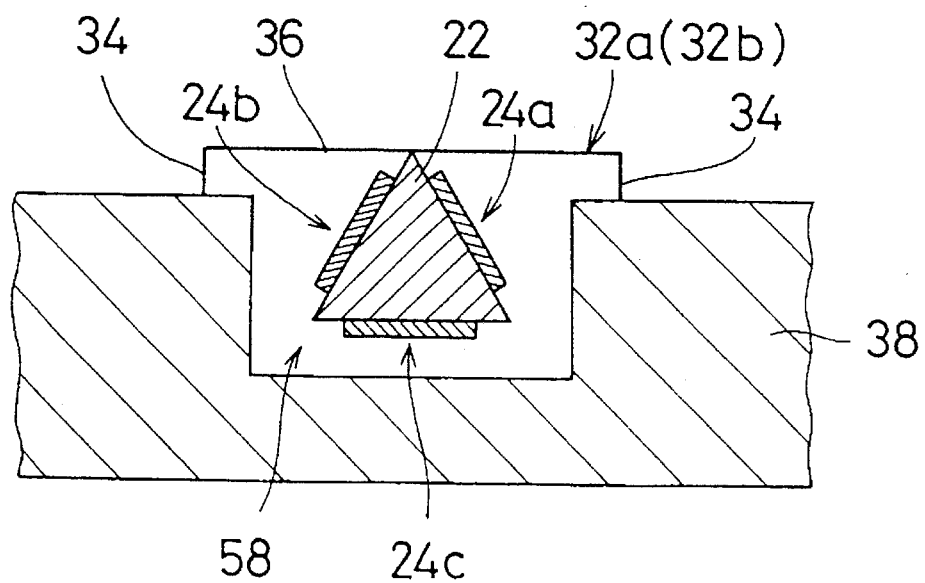
FIG. 5 is a major portion expanded sectional view of an another embodiment of the present invention.

FIG. 5 is a major portion expanded sectional view of an another embodiment of the present invention.

In the vibrating gyroscopes shown in FIGS. 1–4, a opening is formed to the supporting board 38 as holding portion for holding a part of the vibrating body 22. However, the holding portion is not limited to a opening, but it can be a recess 58 as shown in FIG. 5 depending on the thickness of the supporting board 38.

It will be apparent from the foregoing that, while the present invention has been described in detail and illustrated, these are only particular illustrations and example, and the invention is not limited to these. The spirit and scope of the invention is limited only by the appended claims.

What is claimed is:

1. A vibrating gyroscope comprising:

a rod-like vibrating body, two supporting members are fixed in the vicinity of nodal points of said vibrating body in order to support said vibrating body thereupon; and a supporting board for fixing said supporting members, said supporting board having a first side and a second side, and including a holding portion therein for receiving and holding a part of said vibrating body in said supporting board, said vibrating body being supported in said holding portion by said two supporting members wherein said holding portion comprises an opening piercing through said supporting board from the first side of said supporting board to the second side of said supporting board, and wherein a periphery of the holding portion is defined by a periphery of the opening.

2. A vibrating gyroscope comprising:

a rod-like vibrating body, two supporting members are fixed in the vicinity of nodal points of said vibrating body in order to support said vibrating body thereupon: and a supporting board for fixing said supporting members, said supporting board having a first side and a second side, and including a holding portion therein for receiving and holding a part of said vibrating body in said supporting board, said vibrating body being supported in said holding portion by said two supporting members wherein said holding portion comprises a recess formed on said supporting board, and wherein a periphery of the recess defines a periphery of the holding portion.

3. The vibrating gyroscope in accordance with claims 1 or 2, wherein a circuit component is mounted on said supporting board, together with said vibrating body.

4. The vibrating gyroscope in accordance with claim 1, wherein the periphery of said opening has extended portions which widen the opening in an area adjacent side faces of said vibrating body.

5. The vibrating gyroscope in accordance with claim 4, wherein said opening has a cross-shaped configuration from the viewpoint of a vertical plane perpendicular to a plane of said supporting board.

6. The vibrating gyroscope in accordance with claim 1, wherein each of said supporting members include a section which is straight in shape, and wherein both ends of each of said supporting members are fixed to said supporting board adjacent an end of said opening provided on said supporting board so that said vibrating body is held in said opening such that said vibrating body protrudes through said opening from the first side to the second side of the supporting board.

7. A vibrating gyroscope comprising a plurality of the vibrating gyroscopes described in claim 1; wherein a plurality of vibrating bodies of said plurality of vibrating gyroscopes are configured are piled in a vertical stack wherein longitudinal axes of adjacent vibrating bodies are perpendicular to each other.

8. The vibrating gyroscope in accordance with claim 7, wherein a plurality of said holding portions are formed by a plurality of said opening portions piercing through the first sides of each of a plurality of said supporting boards to the second sides of each of the plurality of said supporting boards.

9. The vibrating gyroscope in accordance with claim 7, wherein a plurality of said holding portions are formed by a plurality of said recesses formed on said supporting boards.

10. The vibrating gyroscope in accordance with claims 7 or 8, wherein a plurality of circuit components are mounted on a plurality of said supporting boards, together with a plurality of said vibrating bodies.

11. The vibrating gyroscope in accordance with claim 9, wherein a plurality of circuit components are mounted on a plurality of said supporting boards, together with a plurality of said vibrating bodies.

12. The vibrating gyroscope in accordance with claim 2, wherein a circuit component is mounted on said supporting board, together with said vibrating body.

13. The vibrating gyroscope in accordance with claim 2, wherein the periphery of said recess has extended portions which widen the opening in an area adjacent side faces of said vibrating body.

14. The vibrating gyroscope in accordance with claim 13, wherein said recess has a cross-shaped configuration from the viewpoint of a vertical plane perpendicular to a plane of said supporting board.

15. The vibrating gyroscope in accordance with claim 2, wherein each of said supporting members include a section which is straight in shape, and wherein both ends of each of said supporting members are fixed to said supporting board adjacent an end of said recess provided on said supporting board so that said vibrating body is held in said recess such that said vibrating body protrudes through said opening from the first side to the second side of the supporting board.

* * * * *